(12) United States Patent
Spino

(10) Patent No.: US 9,791,147 B2
(45) Date of Patent: Oct. 17, 2017

(54) MULTI STAGE COMBUSTION FURNACE AND PROCESS FOR THE THERMAL EXPANSION OF MINERAL PARTICLES

(75) Inventor: Michael Spino, Lachine (CA)

(73) Assignee: TERAJOULE INC., Lachine (CA)

(*) Notice: Subject to any disclaimer, the term of this patent is extended or adjusted under 35 U.S.C. 154(b) by 790 days.

(21) Appl. No.: 13/253,411

(22) Filed: Oct. 5, 2011

(65) Prior Publication Data

US 2012/0080022 A1    Apr. 5, 2012

Related U.S. Application Data

(60) Provisional application No. 61/389,825, filed on Oct. 5, 2010.

(51) Int. Cl.
*F24C 1/14*      (2006.01)
*F23C 99/00*    (2006.01)
*F23C 5/08*      (2006.01)
*F23C 7/02*      (2006.01)
*F23C 7/06*      (2006.01)

(52) U.S. Cl.
CPC .............. *F23C 99/005* (2013.01); *F23C 5/08* (2013.01); *F23C 7/02* (2013.01); *F23C 7/06* (2013.01); *F23C 2900/07022* (2013.01); *Y02E 20/348* (2013.01)

(58) Field of Classification Search
USPC .............. 431/188; 110/182.5, 182.6; 126/77; 266/267
See application file for complete search history.

(56) References Cited

U.S. PATENT DOCUMENTS

| | | | | |
|---|---|---|---|---|
| 1,164,854 | A * | 12/1915 | Oesterlen et al. | ............. 431/188 |
| 2,639,132 | A * | 5/1953 | Bradford | .......................... 432/58 |
| 4,347,155 | A * | 8/1982 | Jenkins | ................. C04B 20/066 252/378 P |
| 5,878,676 | A * | 3/1999 | Jochem et al. | ................ 110/261 |
| 6,244,860 | B1 | 6/2001 | Gross et al. | |

* cited by examiner

*Primary Examiner* — Avinash Savani
*Assistant Examiner* — Vivek Shirsat
(74) *Attorney, Agent, or Firm* — Benoit & Cote Inc.

(57) ABSTRACT

The present document describes a multistages combustion furnace system for thermal expansion of mineral particles which comprises: a furnace having an expansion chamber for receiving the mineral particles; a burner head to be connected at a distance for an atmospheric coupling of the furnace and for operating the multistages combustion furnace system; a furnace device to be connected at a distance for an atmospheric coupling of the burner head to offset the quenching effect of ambient air normally drawn in the furnace; and a tuyere for thermal expansion of mineral particles to be connected between the expansion chamber and the furnace device; wherein the multistage combustion furnace system is to be connected with an inlet of preheated air.

12 Claims, 17 Drawing Sheets

TOP VIEW

ELEVATION - FRONT - CUTAWAY

TOP

SECTION

TOP

SECTION

TOP

SECTION

MULTI STAGE COMBUSTION FURNACE AND PROCESS FOR THE THERMAL EXPANSION OF MINERAL PARTICLES

CROSS-REFERENCE TO RELATED APPLICATIONS

This application claims priority under 35USC§119(e) of U.S. provisional patent application 61/389,825, filed on Oct. 5, 2010, the specification of which is hereby incorporated by reference.

TECHNICAL FIELD

This description relates to a furnace device to thermally treat finely divided particulate matter and a method for producing expanded minerals.

BACKGROUND

Expanded mineral particles are used in a wide range of applications such as insulation, refractories, admixtures for aggregates, soil mixes and the like, where a desired goal of the producer is to transform minerals, such as perlite and vermiculite, from their original mined state into lightweight expanded matter having certain predetermined physical characteristics at a reasonable cost.

The majority of furnaces employed to expand minerals in operation today are energy inefficient. A typical furnace consists of an oil or gas burner and a venturi to accelerate the air/fuel mixture into a tuyere mounted below a vertical tube through which crude mineral ore to be expanded is fed into the open flame. Cold atmospheric air is drawn into the venturi and up into the furnace through a negative draught condition from the exhaust fan. A forced draught fan provides combustion air to the burner. The fuel cloud enters the furnace at the venturi which is positioned directly above the burner head. The combustion air and fuel, ejected at high velocity from the burner head travel through an open gap before reaching the venturi. This condition naturally draws in surrounding cold air into the furnace. For the purposes of this description, this type of combustion setup is referred to as having an atmospheric coupling; i.e. the burner is not fully enclosed. The flame can be directly seen through the open space below the venturi and also through an open port typically fitted onto the side of the tuyere to release to atmosphere under expanded ore and impurities from the continuous process. The fuel air mixture lights and burns through the venturi and tuyere as the flame advances upwards into the vertical expansion chamber. The flame and hot gases heat a steady stream of mineral particles fed into the furnace. In the case of perlite the ore granules glow red as they are heated through the plastic stage. Water of crystallization and other gases that are present in the hot glassy perlite are released as vapour, causing an immediate and significant expansion. Once expanded, the particles, being sufficiently lighter in weight, are carried to the top of the furnace by the process air. Not all the ore fed to the furnace fully expands. Impurities may be present in small amounts which never expand; i.e. obsidian in the case of perlite. These particles must be continuously withdrawn from the combustion zone failing which combustion becomes erratic and the operation shuts down. For this reason alone, systems using atmospheric combustion are preferred. This method always leaves a space where unexpanded mineral can simply fall out of the furnace through a gap and thereby results in a continuous operation. In furnaces designed with atmospheric combustion the pressure above the venturi is near zero so that an opening on the tuyere's slope can be advantageously made to let out undesirable higher density ore, impurities and partly fused agglomerates. This opening also serves to see the flame particle turbulence where it is greatest. The expanded mineral is subsequently separated from the hot process air in cyclones or other separators, cooled, graded and packaged. The exhaust air is diluted with cooling air and filtered in a bag house filter. An induced draught fan pulls the air through the furnace and bag filter and discharges to atmosphere.

In recent years, many attempts have been made to achieve higher efficiency expanded mineral production. The approach often used is to pressurize the furnace by having the burner fully enclosed and having a furnace construction that preheats the combustion air by having it pass outside of the expansion chamber as fully described in U.S. Pat. No. 2,639,132, May 19, 1953 J. H. Bradford. However these systems are much more expensive to build and maintain. The positive operating pressure within the expansion chamber presents a challenge and risk as thermal cracks commonly appear in this chamber which are typically replaced annually. Once cracks form, hot gases under pressure escape. Additionally a separate solution to unexpanded ore dropouts must be provided and direct visual access to the flame is lost as there can be no open port on the side of the tuyere as is the case in the furnace with the typical atmospheric coupling.

There are many installations of furnaces that are employed to expand minerals such as perlite and vermiculite, oxides of metals or otherwise thermally treat mineral particles on a continuous basis.

As an example, U.S. Pat. No. 6,244,860 relates to an apparatus for producing perlite granules, which is having an expansion tube and one or more burners arranged at one end of the expansion tube. The combustion air is blown into the flame through one or more combustion air nozzles. An additional subsonic nozzle is arranged in at least one combustion air nozzle. In this process for expanding raw perlite in the updraft from a flame, with the introduction of oxygen or oxygen-enriched air into this flame, the oxygen or oxygen-enriched air is introduced axially into the flame through subsonic nozzles.

Additionally, in U.S. Pat. No. 2,639,132 (James H. Bradford), there is provided a processing furnace for discrete solids having a fully enclosed and therefore pressurized burner. The processing furnace provides for a closed waste compartment at the base of the furnace fitted with a door for waste removal at convenient intervals. Such a door, if opened during operation, would issue hot process gases under pressure which is dangerous and not recommended. Therefore the furnace needs to be shut down periodically for clean out thereby loosing the efficiency benefits of a continuous operation.

Moreover, U.S. Pat. No. 4,347,155 (Kenneth L. Jenkins) shows preheated combustion air supplied to a fully enclosed burner and is subject to the positive pressure as developed by the combustion air fan and additionally shows a secondary air pipe for admitting preheated air above the venturi into a second enclosure which surrounds at least a portion of the wall of the expansion chamber. It is to be noted that this device is fully enclosed, operates under pressure and does not provide this secondary pre-heated air which is admitted below the venturi around the burner head nor does it provide for a tertiary stage pre-heated combustion air stream around the venturi.

Current practice is for the combustion to take place at the base of the expansion chamber which is open to atmosphere. In the case of perlite, the expansion operation typically requires four to five times (400-500%) more energy than the theoretical heat calculations suggest. Most of this heat is contained within the exhaust air which is rejected to atmosphere and seldom used.

Because the furnace is open to atmosphere at its base, cold air is naturally drawn into the furnace which dilutes the hot flame and this adversely affects overall efficiency. This cold air drawn in at the base is referred to as 'dilution' or 'secondary air'. Some additional air above the stoichiometric ratio is useful to ensure complete combustion and to assist in lifting the expanded perlite out of the furnace however it has been observed that 40-60 percent excess air is typically drawn in at this point which adversely affects the efficiency of the expansion operation.

For these disadvantages established, there is therefore a need for an improved furnace device to offset the quenching effect of the cold air normally drawn in at that point and to increase conversion and yield in any process of thermal expansion of mineral particles.

SUMMARY

It is an object of the present disclosure to provide an improved furnace device to offset the quenching effect of the ambient air normally drawn into the furnace around the flame and which features a burner with the very useful atmospheric coupling below the venturi and to provide a higher efficiency process for thermal expansion of mineral particles.

It is another object to provide a furnace device to be installed in a furnace system to offset the quenching effect of ambient air drawn in the furnace system which comprises: a burner head positioned at a distance for an atmospheric coupling of the furnace system; and a ring portion from which an air curtain extends peripherally from the burner head thereby forming a controlled secondary combustion stage and an atmospheric coupling of the burner head with a tuyere of the furnace system.

According to another embodiment, there is provided the furnace device as described above, wherein the burner head is for fuel.

According to another embodiment, there is provided the furnace device as described above, wherein the fuel is oil.

According to another embodiment, there is provided the furnace device as described above, wherein the burner head is for gas.

According to another embodiment, there is provided the furnace device as described above, wherein the air curtain comprises preheated air.

According to another embodiment, there is provided the furnace device as described above, wherein the air curtain comprises preheated combustion air.

According to another embodiment, there is provided the furnace device as described above, wherein the ring portion is of a circular configuration.

According to another embodiment, there is provided the furnace device as described above, wherein the ring portion is made of a metallic material suitable for the temperature encountered.

It is yet another object to provide a tuyere for thermal expansion of mineral particles installed on an expansion chamber of a furnace system which comprises: an air inlet which is installed inside the tuyere to provide an heated air intake causing a tertiary combustion stage surrounding a burning flame with higher oxygen air.

According to another embodiment, there is provided the tuyere as described above, wherein the air inlet is positioned at a point where combustion takes place above a venturi in an atmospheric coupling.

According to another embodiment, there is provided the tuyere as described above, wherein the air inlet is positioned at a point where combustion takes place partly below a venturi in an atmospheric coupling.

According to another embodiment, there is provided the tuyere as described above, wherein the air inlet is positioned at a point where the flame front is already established to provide a tertiary combustion stage surrounding a burning flame.

According to another embodiment, there is provided the tuyere as described above, wherein the air inlet is positioned at a point for a gas flame pre-ignition.

It is yet another object to provide tuyere kit for a furnace for thermal expansion of mineral particles to be installed on an expansion chamber of a furnace system which comprises: an air inlet to be installed inside the tuyere to provide a preheated air intake causing a tertiary combustion stage surrounding a burning flame with higher oxygen air.

According to another embodiment, there is provided the tuyere kit as described above, wherein the air inlet is to be positioned at a point where combustion takes place above a venturi in an atmospheric coupling.

According to another embodiment, there is provided the tuyere kit as described above, wherein the air inlet is to be positioned at a point where combustion takes place below a venturi in an atmospheric coupling.

According to another embodiment, there is provided the tuyere kit as described above, wherein the air inlet is to be positioned at a point where the flame front is already established to provide a tertiary combustion stage surrounding a burning flame.

According to another embodiment, there is provided the tuyere kit as described above, wherein the air inlet is to be positioned at a point where the flame front is already established to provide a tertiary combustion stage surrounding a burning flame.

According to another embodiment, there is provided the tuyere kit as described above, wherein the air inlet is to be positioned at a point for a gas flame pre-ignition.

It is yet another object to provide a multistage combustion furnace system kit for a furnace and a tuyere for thermal expansion of mineral particles which comprises:
- a furnace having an expansion chamber for receiving the mineral particles;
- a burner head to be connected at a distance for an atmospheric coupling of a furnace and for operating the multistages combustion furnace system, wherein the furnace has an expansion chamber;
- a furnace device to be connected at a distance for an atmospheric coupling of the burner head to offset the quenching effect of ambient air normally drawn in a furnace, wherein said furnace device is to be installed between said burner head and a tuyere; and
- a tuyere for thermal expansion of mineral particles to be connected between the expansion chamber and the furnace device;
- wherein an inlet of preheated air is to be connected to at least one of a tuyere, the burner head or a furnace device.

According to another embodiment, there is provided the multistage combustion furnace system kit as described above, wherein the burner head is for gas.

According to another embodiment, there is provided the multistage combustion furnace system kit as described above, wherein the fuel is oil.

According to another embodiment, there is provided the multistage combustion furnace system kit as described above, wherein an inlet of preheated air is to be connected to at least two of the tuyere, the burner head or the furnace device.

According to another embodiment, there is provided the multistage combustion furnace system kit as described above, wherein an inlet of preheated air is to be connected to the tuyere, the burner head and the furnace device.

According to another embodiment, there is provided the multistage combustion furnace system kit as described above, wherein the tuyere is to be connected to an air inlet.

According to another embodiment, there is provided the multistage combustion furnace system kit as described above, wherein the burner head is to be connected to an air inlet.

According to another embodiment, there is provided the multistage combustion furnace system kit as described above, wherein the burner head is to be connected to an adjustable air inlet to adjust the amount of air intake.

It is another object to provide a multistage combustion furnace system for thermal expansion of mineral particles which comprises:

a furnace having an expansion chamber for receiving the mineral particles;

a burner head connected at a distance for an atmospheric coupling of the furnace and for operating the multistage combustion furnace system;

a furnace device connected at a distance for an atmospheric coupling of the burner head to offset the quenching effect of ambient air normally drawn in the furnace; and a tuyere for thermal expansion of mineral particles connected between the expansion chamber and the furnace device;

wherein an inlet of preheated air is connected to at least one of the tuyere, the burner head or the furnace device.

According to another embodiment, there is provided the multistage combustion furnace system as described above, wherein the burner head is for gas.

According to another embodiment, there is provided the multistage combustion furnace system as described above, wherein the fuel is oil.

According to another embodiment, there is provided the multistages combustion furnace system as described above, wherein an inlet of preheated air is connected to at least two of the tuyere, the burner head or the furnace device.

According to another embodiment, there is provided the multistage combustion furnace system as described above, wherein an inlet of preheated air is connected to the tuyere, the burner head and the furnace device.

According to another embodiment, there is provided the multistage combustion furnace system as described above, wherein the tuyere is connected to an air inlet.

According to another embodiment, there is provided the multistage combustion furnace system as described above, wherein the burner head is connected to an air inlet.

According to another embodiment, there is provided the multistage combustion furnace system as described above, wherein the burner head is connected to an adjustable air inlet to adjust the amount of air intake.

The following terms and expressions are defined below.

The expression "expanded mineral particles" is intended to mean any mineral that expands upon heating. Examples include without limitation, perlite, vermiculite, diatomite, pumice and specific types of clay and shale, and the like. More particularly, perlite is a generic term for a naturally occurring mineral glass.

The term "hot tuyere" refers to a device of this invention having a vertically diverging inner cone that surrounds the major portion of the flame, an outer cylindrical body that receives preheated combustion air, a venturi throat section to accelerate the air fuel mixture into the furnace and a venturi crown to promote intermingling of the air and air fuel mixture.

The term "hot air ring" refers to a device of this invention that produces a hot air curtain that stops the natural draft of cold air ingress surrounding the burner head.

The expression "atmospheric coupling" is intended to mean a free space between the burner head and the tuyere wherein the air-fuel mixture crosses up through the venturi whilst heavy particulate matter that did not expand falls out of the tuyere through this same space.

The expression "ambient air" is intended to mean air at ambient temperature. In normal configurations of furnace systems, the ambient air entering the furnace would require the furnace system to provide more energy.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present description relates to a multistage combustion furnace system and a process for the thermal expansion of mineral particles. The present description relates to a multistage combustion furnace system furnace for decreasing the energy consumption of the process for the thermal expansion of mineral particles.

Figure 1:
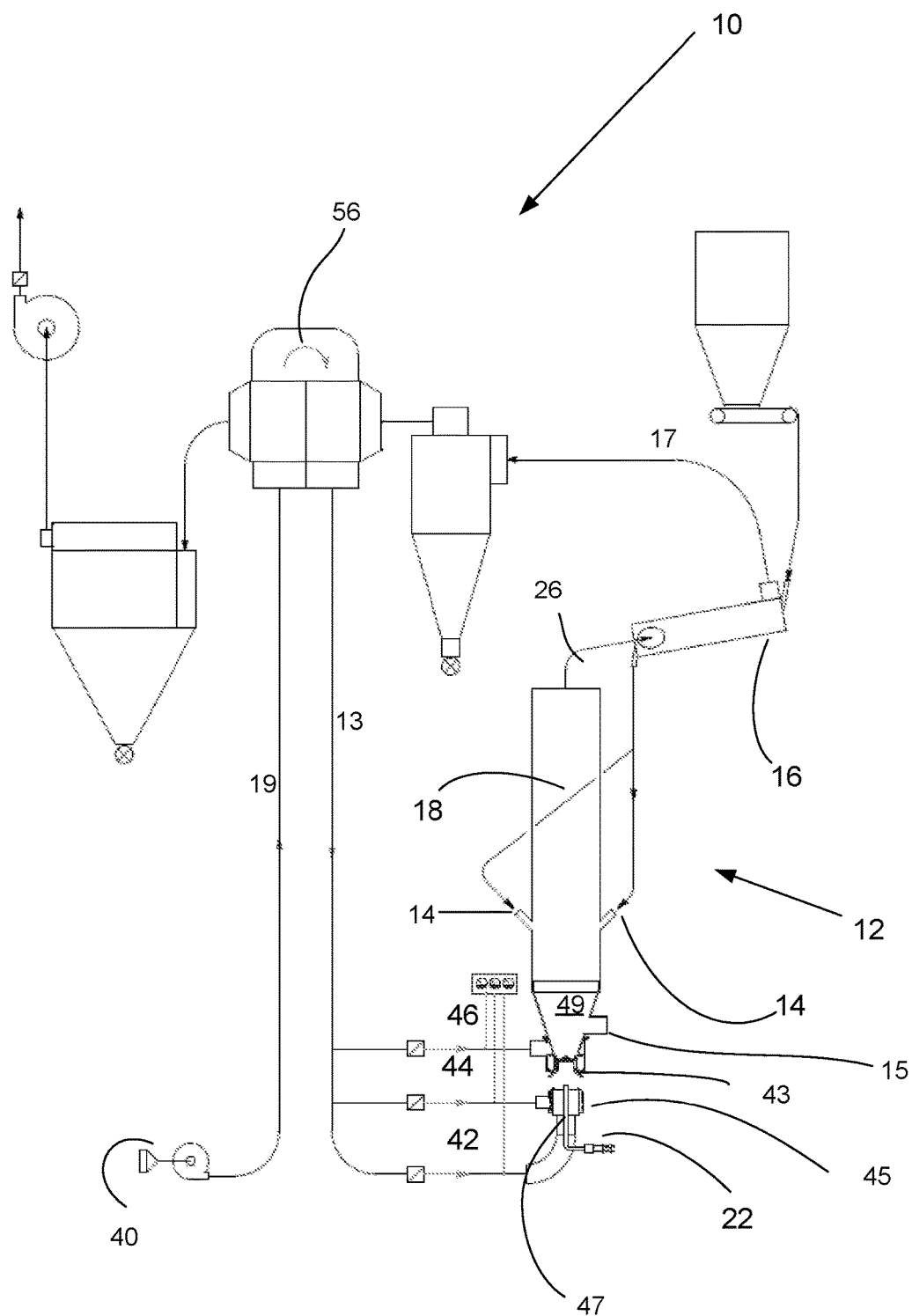
FIG. 1 illustrates the flow sheet which describes a process for thermal expansion of mineral particles including a multistage combustion furnace system in accordance with an embodiment.
Figure 10:
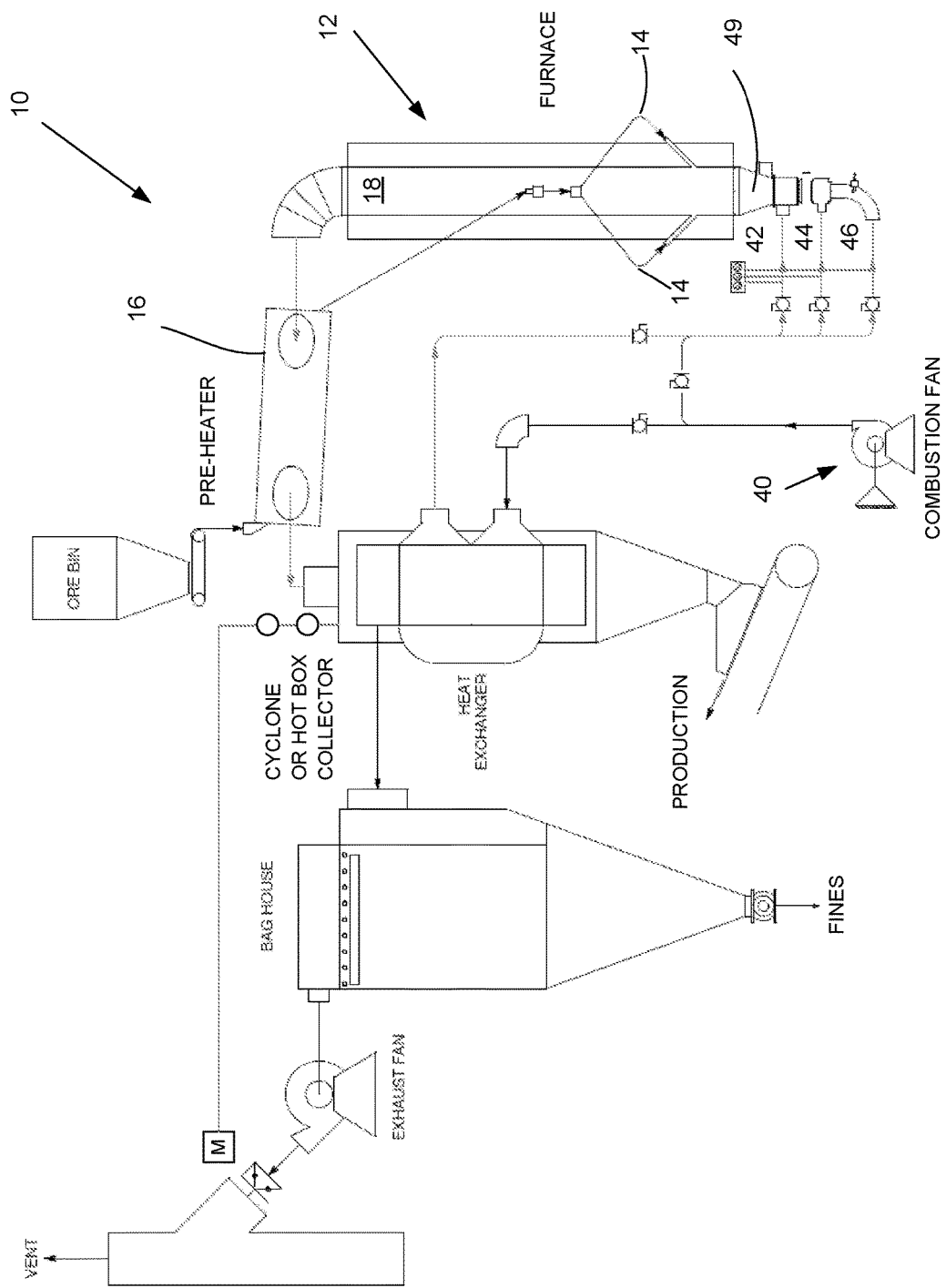
FIG. 10 illustrates the flow sheet which describes a process for the thermal expansion of mineral particles including a multistage combustion furnace system in accordance with another embodiment.
Figure 11:
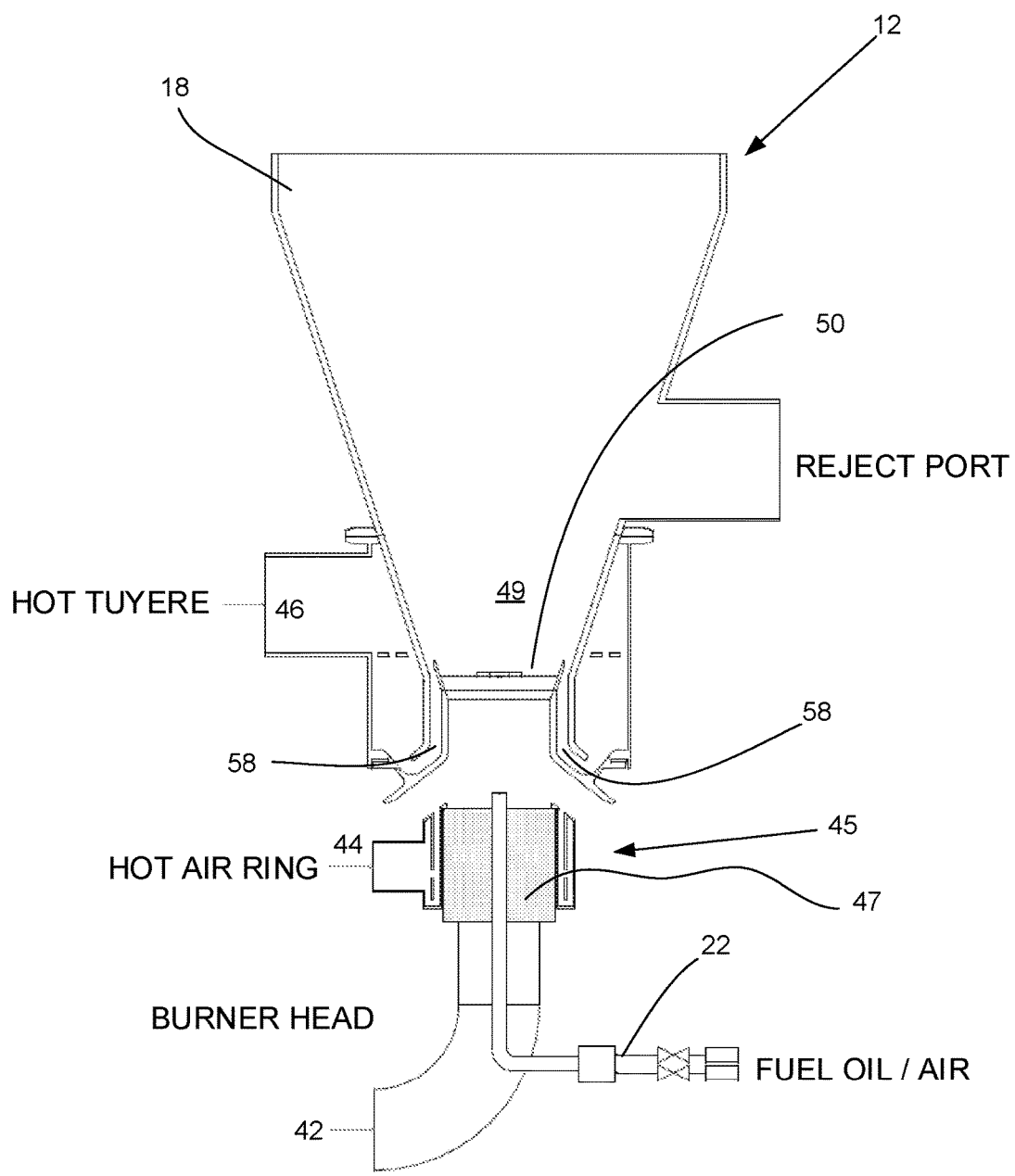
FIG. 11 illustrates a cross-section view of the three stages of combustion air admission to the multistage combustion furnace system for thermal expansion of mineral particles in accordance with another embodiment.
Figure 12A:
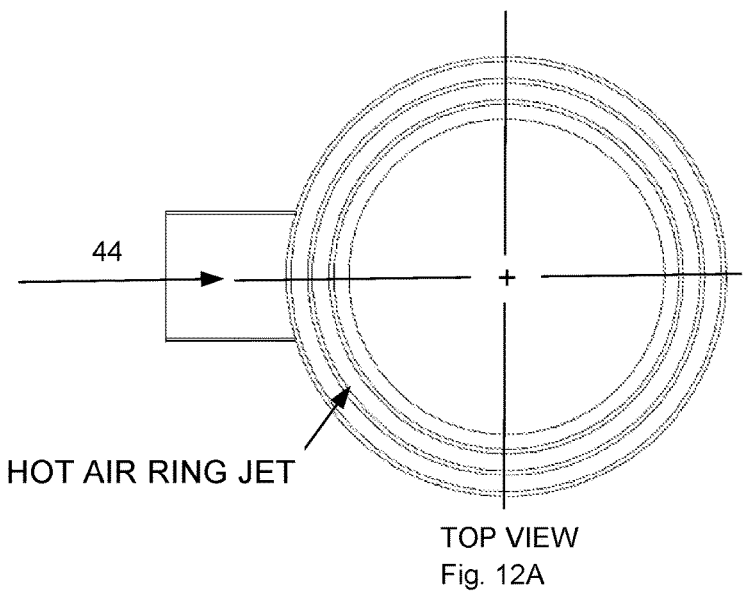
FIG. 12A illustrates a top view of a hot air ring device which offsets the quenching effect of the cold air for thermal expansion of mineral particles in accordance with another embodiment.
Figure 12B:
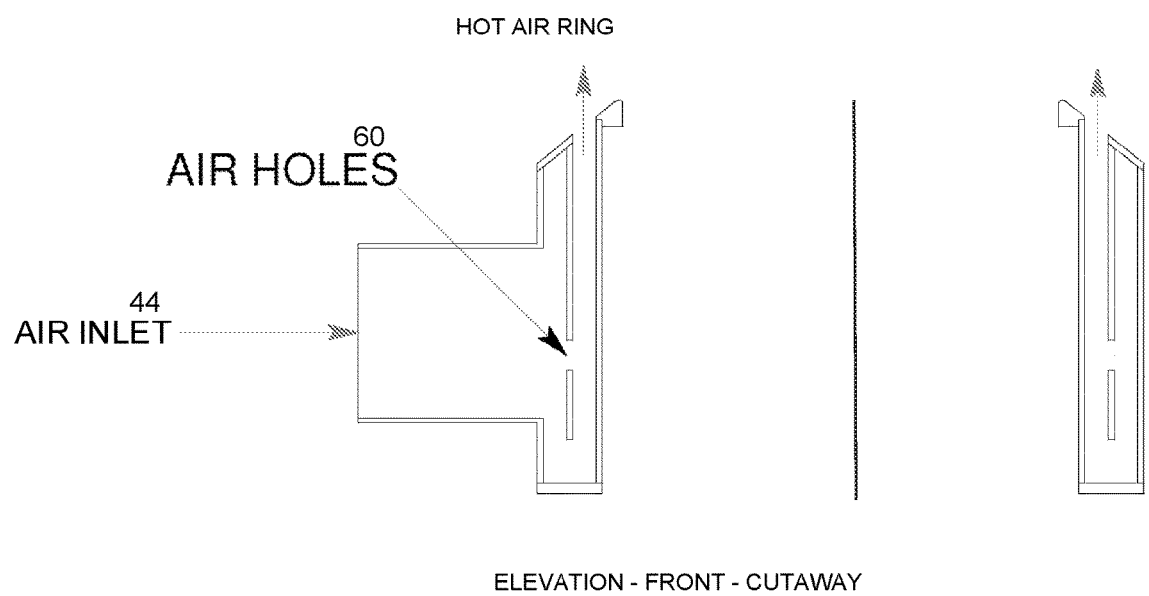
FIG. 12B illustrates an elevation view of the hot air ring device of FIG. 12A which offsets the quenching effect of the cold air for thermal expansion of mineral particles in accordance with another embodiment.
Figure 13:
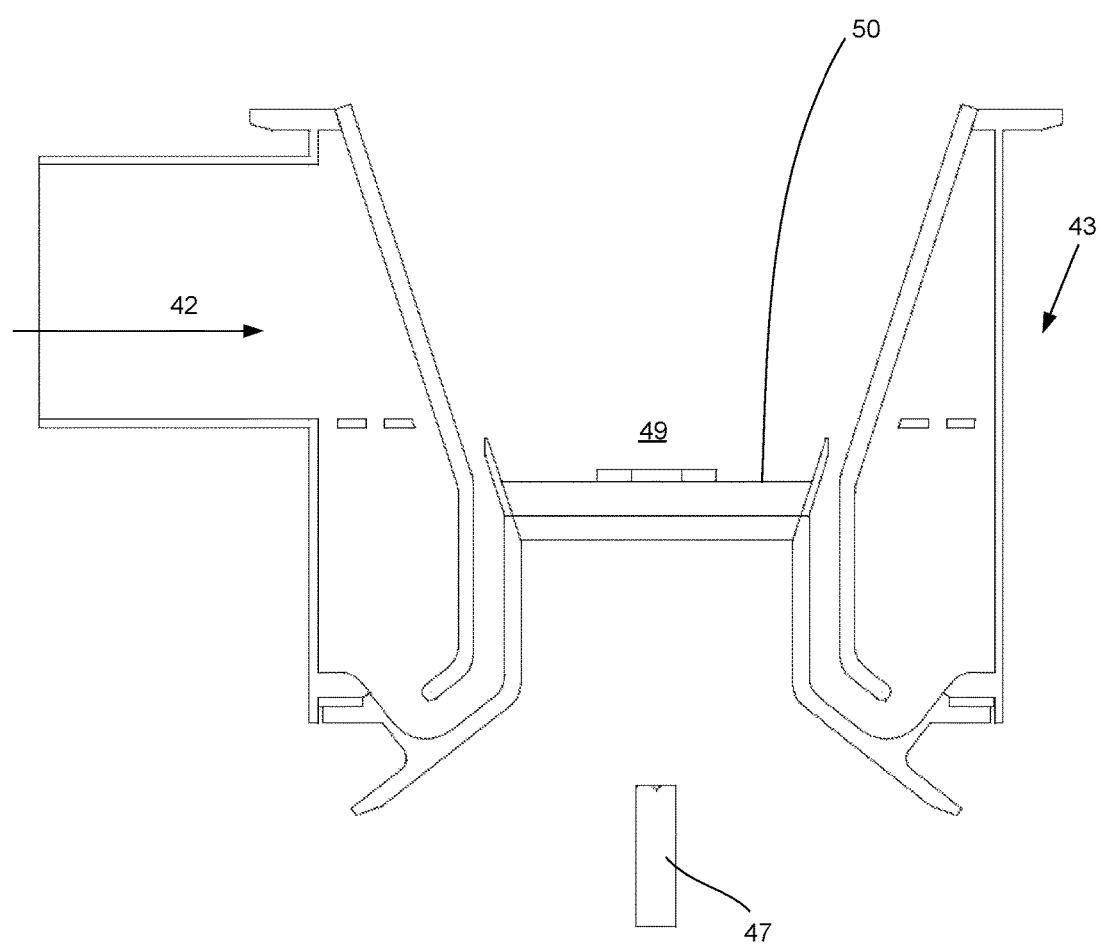
FIG. 13 illustrates a cross-section view of the tuyere designed for a fuel fired furnace system in accordance with another embodiment.
Figure 14A:
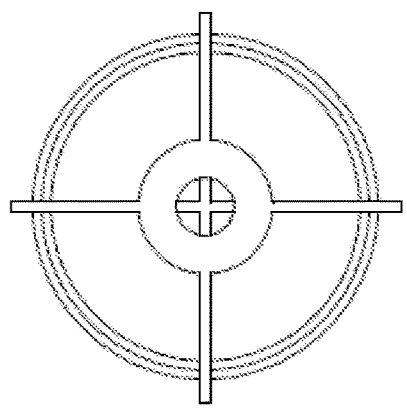
FIG. 14A is a top view of a venturi in accordance with another embodiment.
Figure 14B:
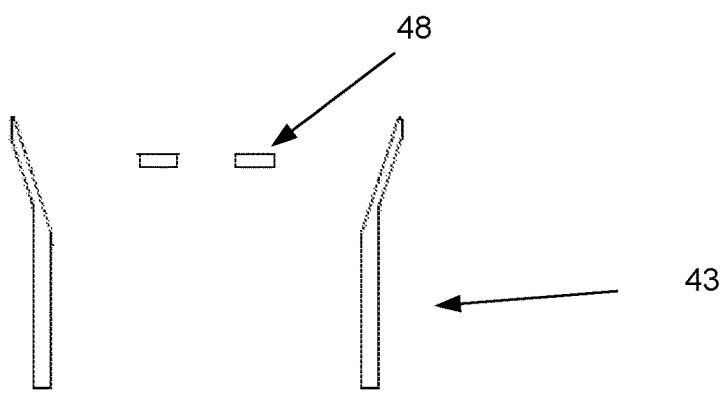
FIG. 14B is a cross-section view of the venturi of FIG. 14A.
Figure 15A:
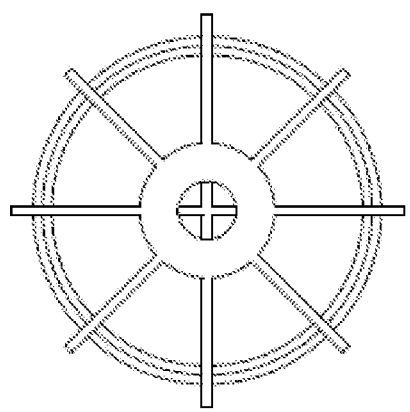
FIG. 15A is a top view of a venturi in accordance with another embodiment.
Figure 15B:
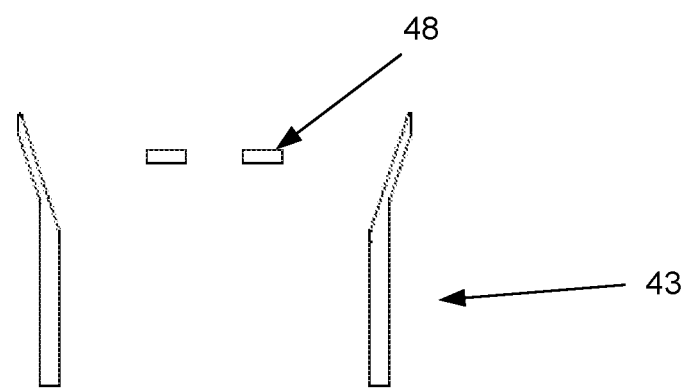
FIG. 15B is a cross-section view of the venturi of FIG. 15A.
Figure 16A:
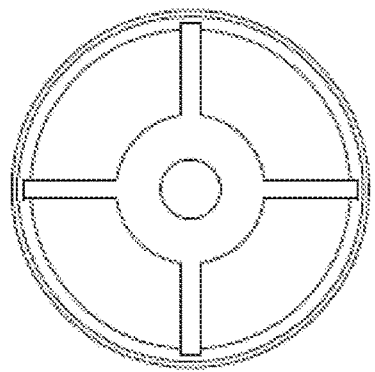
FIG. 16A is a top view of a venturi in accordance with another embodiment.
Figure 16B:
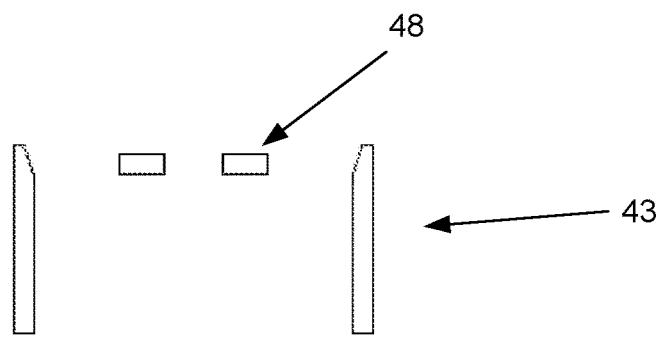
FIG. 16B is a cross-section view of the venturi of FIG. 16A.
Figure 17:
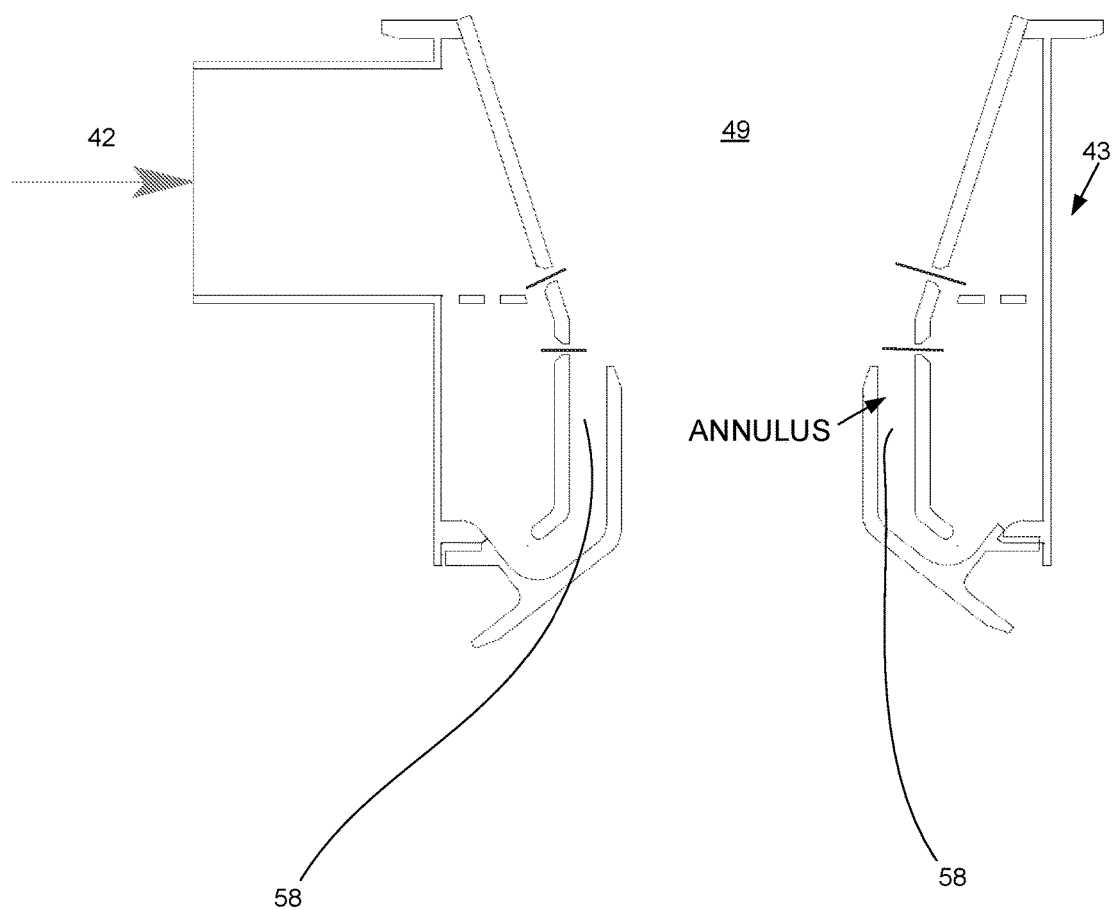
FIG. 17 illustrates a cross-section view of the tuyere designed for gas in accordance with another embodiment.

Now referring to the drawings, and more particularly to FIGS. 1 and 10, there is shown a process 10 for the thermal expansion of mineral particles including a multistage combustion furnace system 12. In the process 10, the combustion air fan 40 supplies cold air to the heat exchanger 56 where valuable heat is gained from the exhaust gases. The pre-heated air 13 is supplied to the multistage combustion furnace system 12, which is open to atmosphere at its base, at three distinct air inlet conduits 42, 44 and 46. The pre-heated air 13 splits to enter the burner head 47 (from the air inlet 42), the hot air ring device or furnace device 45 (air inlet 44) and the hot tuyere 49 (air inlet 46). Combustion air to the burner head 47 (air inlet 42) is greatly reduced so that there is insufficient air for complete combustion. A secondary air flow into the hot air ring device or furnace device 45 which produces an annular air curtain of pre-heated air to prevent the ingress of cold air that naturally occurs at that point.

The hot tuyere 49 delivers the remaining air in a powerful ring jet portion 58 fully surrounding the emerging flame front rising up against the falling particles in counter current mode. As combustion progresses, the hot gases produced interact with a steady stream of mineral particles fed directly into the expansion chamber 18 above and into the flame for heat treating or expansion as the case may be. The expanded minerals rise up the multistage combustion system furnace 12 with the process air from air inlets 42, 44 and 46 while unexpanded and heavier matter simply falls out the bottom of the expansion chamber 18 of the multistage combustion furnace system 12 through the venturi 43 (extend line to reach the center of the venturi) or is ejected from the open port 15 and falls to the ground for later pickup and disposal. The furnace system 12 exhaust gases have sufficient velocity to carry the now lightweight material out the top of the multistage combustion furnace system 12. The hot exhaust gas then enters a double wall rotating drum having raw ore flowing through the inner cylinder and hot exhaust with expanded particulate matter flowing through the space formed by the fixed shell and rotating drum for ore preheating prior to entering the multistage combustion furnace system 12. Expanded material is separated from the exhaust air by a cyclone, settling chamber or other suitable collector, where after the particles are cooled and packaged or stored.

Exhaust air leaves the furnace top at about 1 832° F. or about 1000° C., in the case of perlite. Due mainly to air leaks in the rotary heater, through slip flanges and radiation losses, the air temperature drops to about 1000 to about 1,200° F. (about 538-about 650° C.). The heat exchanger 56 is positioned after both the ore preheater and product separator so as to protect the heat transfer elements from undue abrasive wear. The hot air expelled from the multistage combustion furnace system 12 is further diluted with cold air bleed-in ducts in order to protect the bag filter and fan from high temperature. The multistage combustion furnace system 12 operates under negative pressure so that all openings draw cold air in.

The typical perlite furnace uses more combustion air than is necessary for expansion. The high value of excess air is the result of the natural suction produced by the high velocity flow of the air fuel mixture through the venturi 43 without a hot air ring or furnace device. Far greater thermal efficiency can be obtained by reducing the air flow that enters the system 10 to just above the stochiometric or theoretical levels required to burn the fuel instead of the 40-60% excess air as typical of conventional furnaces. Because the process 10, having a hot air ring or furnace device 45 and hot tuyere 49, needs very little excess air, fuel consumption and exhaust air heat losses are significantly reduced. As a result of using near stoichiometric air to fuel ratios, the flame burns hotter, more evenly and intensively and it glows brighter. At this point, mineral particles expand in a more lively fashion resulting in higher volume output for the same feed input of particles. Moreover, the production rate goes up, while the specific fuel consumption goes down which translates into higher production using less fuel. This positively affects all plant inputs: mineral ore mass, fuel consumption and labor.

Still referring to FIGS. 1 and 10, in the process 10 for the thermal expansion of mineral particles, the multistage combustion furnace device 12 is designed to continuously and rapidly heat crushed and sized ore at high temperature where the discrete ore particles expand. The multistage combustion furnace system 12, which is open to atmosphere to allow atmospheric combustion, comprises an ore feed device 14. The ore feed device 14 may be, without limitations, a bucket elevator, a screw conveyor, a belt conveyor and the like. Furthermore, the multistage combustion furnace system 12 comprises an ore pre-heater 16. The ore pre-heater 16 may be, without limitations, a rotary drum type, a heat exchanger and the like. The ore pre-heater 16 is used to increase the temperature of the unexpanded mineral particles before entering the furnace through the ore feed tubes or chutes 14 that direct the mineral particles through the sides of a tall vertical furnace chamber 18. Indeed, the process 10 for the thermal expansion of mineral particles also comprises a substantially vertical expansion chamber 18 which is typically, without limitations, cylindrical, an air inlet 42 for entering the burner head 47 positioned at the base of the vertical expansion chamber 18 and firing vertically up into the vertical expansion chamber 18, a fuel train 22 with valves to control the flow of fuel, a combustion air fan 40 to provide air for complete combustion of the fuel and an outlet duct 26 atop the furnace to carry away the hot expanded mineral particles to the product collection system. It is to be noted that the fuel burner head 47 may also be a gas burner head 47 for operating a gas fired multistage combustion furnace system. Moreover, the process 10 for the thermal expansion of mineral particles comprises product collection system to separate the expanded mineral particles from the hot air stream, usually consisting, without limitations, of one or more of the following: a hot separator, a hot box, a hot cyclone, a bag filter or the like. The process 10 also comprises an exhaust fan to draw the air expelled from the multistage combustion furnace system 12 through the process 10 and an expanded minerals cooling system. Finally, the system 10 may further comprise interconnecting ductwork to complete the system, rotary airlock valve(s) as may be required and controls and instrumentation.

Preheated air 13 that is required for combustion of fuel or gas and lift for the expanded mineral particles is supplied by the combustion air fan 40. Ducts direct this air to the heat exchanger 56 which transfers heat from the hot exhaust air 17 to the combustion air 19.

Figure 2:
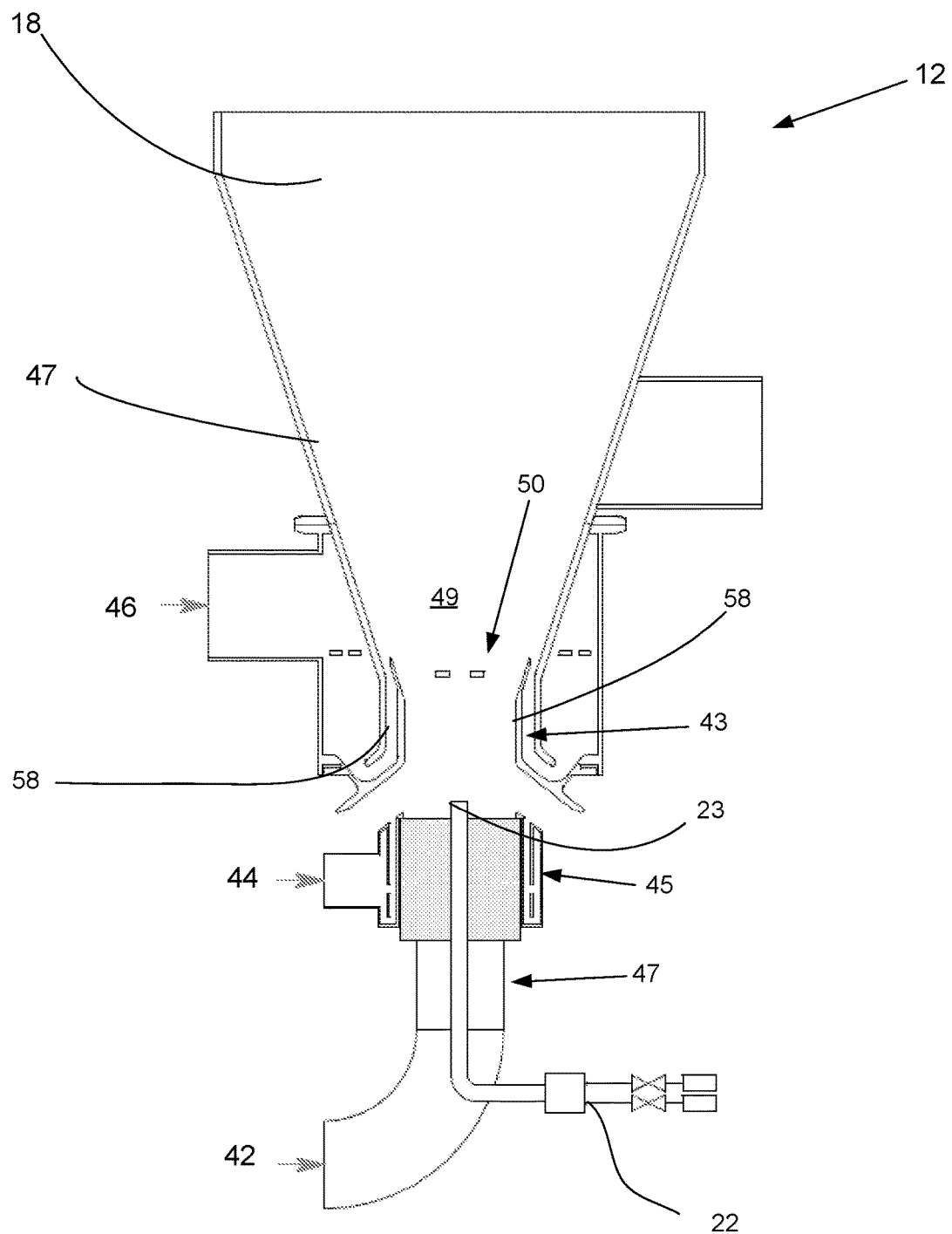
FIG. 2 illustrates the three stages of combustion air admission to the multistage combustion furnace system for thermal expansion of mineral particles in accordance with another embodiment.

Now referring to FIG. 2, there is shown the multistage combustion furnace system 12 and the pre-heated air 13 that flows into three (3) different inlets 42, 44 and 46. The preheated air 13 splits to the burner head 47, the hot air ring device or furnace device 45 and to a high velocity ring jet portion 58 surrounding the venturi 43 above the throat within the body of the hot tuyere 49. By separating the air flow into three air inlets 42, 44 and 46 the effect is thus: approximately half (50%) of the air required to burn all of the fuel or gas is supplied to the burner head 47. A small amount, approximately, 5-15% of secondary air is directed to the hot air ring or furnace device 45 around the atmospheric coupling formed between the burner head 47 and the hot tuyere 49. The balance is supplied in the air inlet 46 where the air is made to shear through the advancing air fuel flame front rising up into the vertical expansion chamber 18 after it flows up through the venturi 43. In order to produce a steady ring jet of preheated air that shears through the flame cloud with strong force, three internal sections in the hot tuyere 49 have been developed: first there is the upper zone where the preheated air 13 enters the hot tuyere 49. It is bound on the periphery by the outer cylindrical body and on the inside by the cone shape of the hot tuyere 49. A flow separator, described as a flat ring with a minimum of four air holes and having a narrow gap between the outer wall and the inner cone define the lower portion of the entry zone whose sole function is to equalize the flow (air inlet 42) entering the hot tuyere 49 so as to be uniform throughout. The second section of the hot tuyere 49 has the largest internal volume of the three zones. It is defined by the flow separator above, the outer cylindrical walls and inner cone of the tuyere 49 and serves as an air capacitor. This feeds the third section called the nozzle zone 23. The internal passages in the nozzle zone 23 are designed to progressively accelerate the preheated air 13 to a velocity comparable to that of the burner head 47 (air inlet 42), typically 6-12,000 fpm (30-60 m/s). The free energy in the preheated air 13 displaces the fuel or gas that would normally be used to raise it up to the pre-heat temperature.

Figure 3:
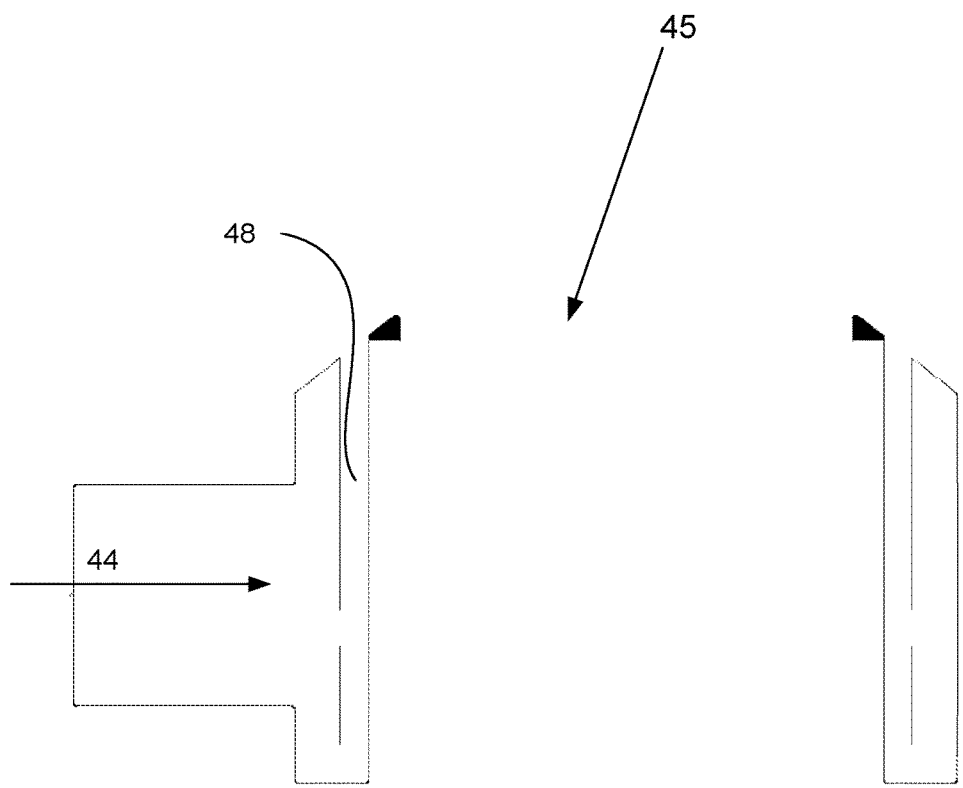
FIG. 3 illustrates a hot air ring device which offsets the quenching effect of the cold air for thermal expansion of mineral particles in accordance with another embodiment.

Now referring to FIG. 3, there is shown a furnace device 45 (or hot air ring device), in accordance with another embodiment, for thermal expansion of mineral particles, which offsets the quenching effect of the cold air naturally drawn into a conventional furnace, with preheated air 13 freely obtained via the heat exchanger 56. The furnace device 12 is to be installed on a multistage combustion furnace system 12 to offset the quenching effect of the cold air drawn in the multistage combustion furnace system 12. The furnace device 45, more particularly is a hot air ring device. It is to be noted that the gas of the hot air ring device may be air, or any other gas that can fit with the furnace device 45. The furnace device 45 comprises a fuel head (FIGS. 1 and 2) arranged at one end of the multistage combustion furnace system 12; and a ring jet portion 58 from which preheated air annular curtain extends peripherally from the burner head 42 thereby forming a controlled secondary combustion stage.

In the furnace device 45 as described above, the air drawn may be preheated combustion air 13. It is also to be noted that the ring jet portion 48 may be circular. Moreover, the ring jet portion 48 of the multistage combustion furnace system 12 may be made of a metallic material suitable for the temperature encountered. Additionally, the multistage combustion furnace system 12 operates with a neutral pressure point above the flame.

Figure 4A:
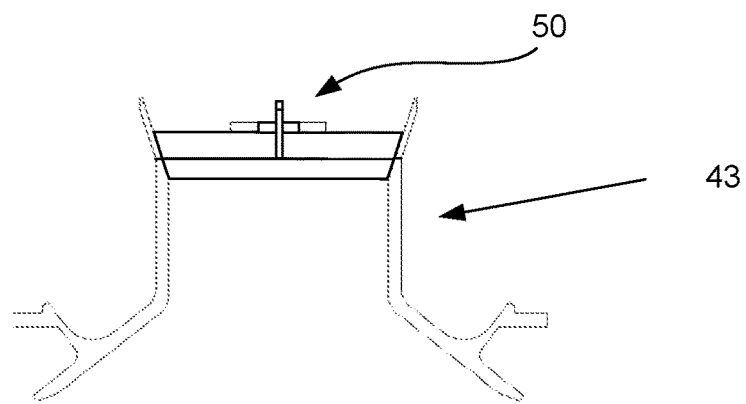
FIG. 4A and FIG. 4B illustrate a venturi crown device within the hot tuyere of the multistage combustion furnace system for thermal expansion of mineral particles in accordance with other embodiments.
Figure 4B:
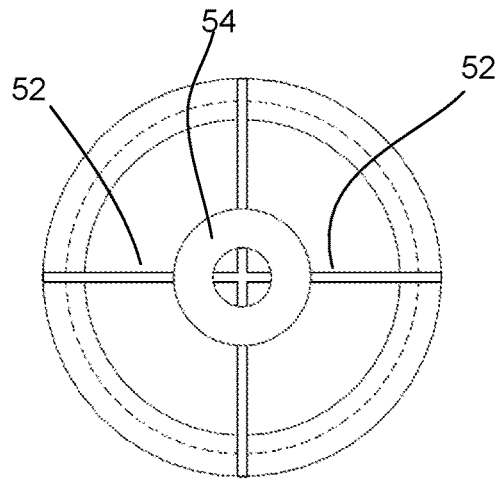
Figure 4B:
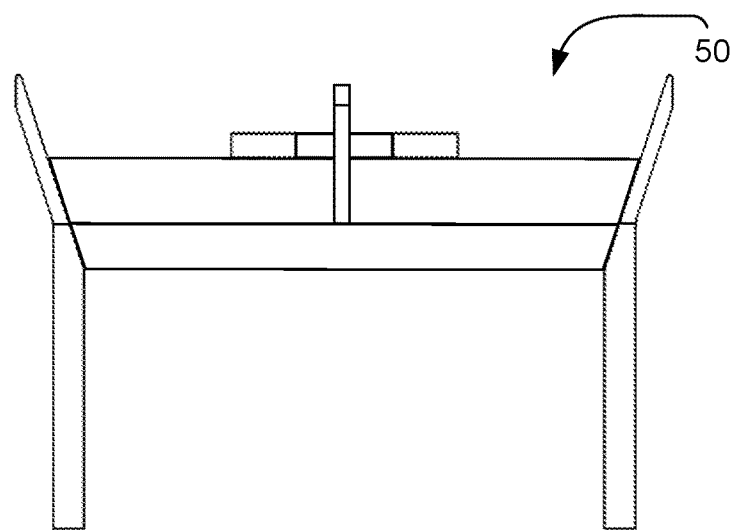

Now referring to FIG. 4A and FIG. 4 there is shown a venturi crown 50 which sits on the top side of the venturi insert 43 in accordance with another embodiment. The venturi crown 50 has a minimum of four radial elements 52 with upwardly diverging inclined tips that extend from the central fuel air cloud zone emerging from the venturi 43 into the annular ring jet portion air stream surrounding the venturi 43. The key feature here is the protruding inclined elements or radial elements 52 of the venturi crown 50 which serves as a pathway for the rich air fuel mixture to stream out from the central portion 54 and be subjected to the full force of the high velocity oxygen rich preheated annular air curtain.

In the case of oil fired multistage combustion furnace systems, an additional flat disc may be fitted to the crossbars of the venturi crown 50. In another embodiment, the inclined elements or radial elements 52 have a V-shaped cross section with the apex on the upper side so that the radial elements 52 form an inclined channel to radially distribute the preheated air 13 across the shearing force of the annular air curtain. The venturi crown 50 adds turbulence to the combustion process and positively contributes to the intimate mixing of the centrally rich air fuel cloud with the remainder of the combustion air as supplied by the annular air curtain.

Figure 5:
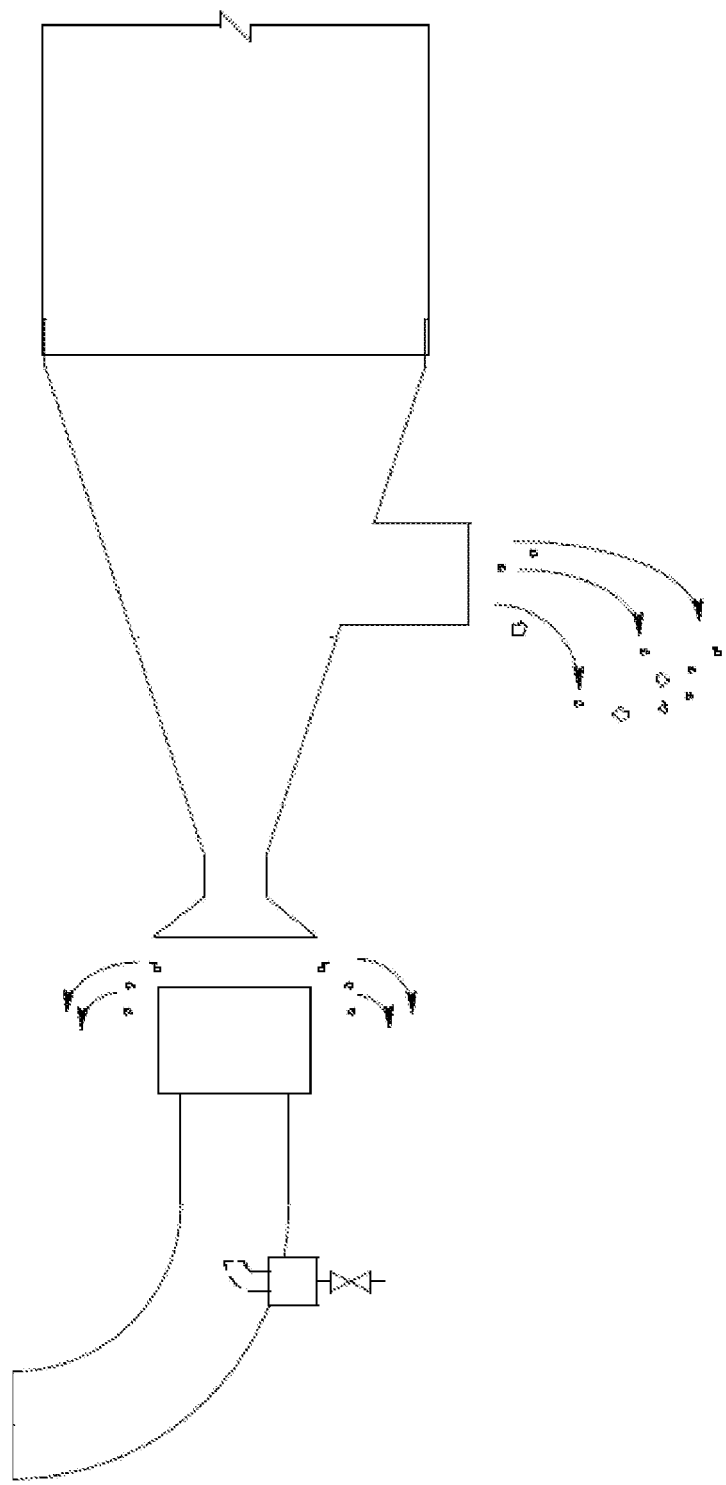
FIG. 5 illustrates a typical furnace before adopting the multistage combustion furnace system for thermal expansion of mineral particles in accordance with another embodiment.

Now referring to FIG. 5, (photograph) there is shown a conventional furnace. The upwardly curved pipe supplies cold combustion air to the burner head which directs the fuel air mixture vertically upwards across an open atmospheric gap. Notice the hot perlite particles being ejected from the furnace. This normally occurs in pulses notice the color changes in the tuyere: red hot on top and cold black metal on the bottom. The temperature variation exceeds about 1000° F. (about 555° C.). This leads to thermal stress deformation and eventual crack formation to relieve this stress. It is common to replace the tuyere every 6 months and the furnace liner or expansion chamber annually, notwithstanding the use of special heat resistant stainless steels for these critical items. This is a direct result of the excessive amount of cold quenching air entering the conventional furnace through the venturi 46 and reject port fitted to the side of the tuyere 47.

Figure 6:
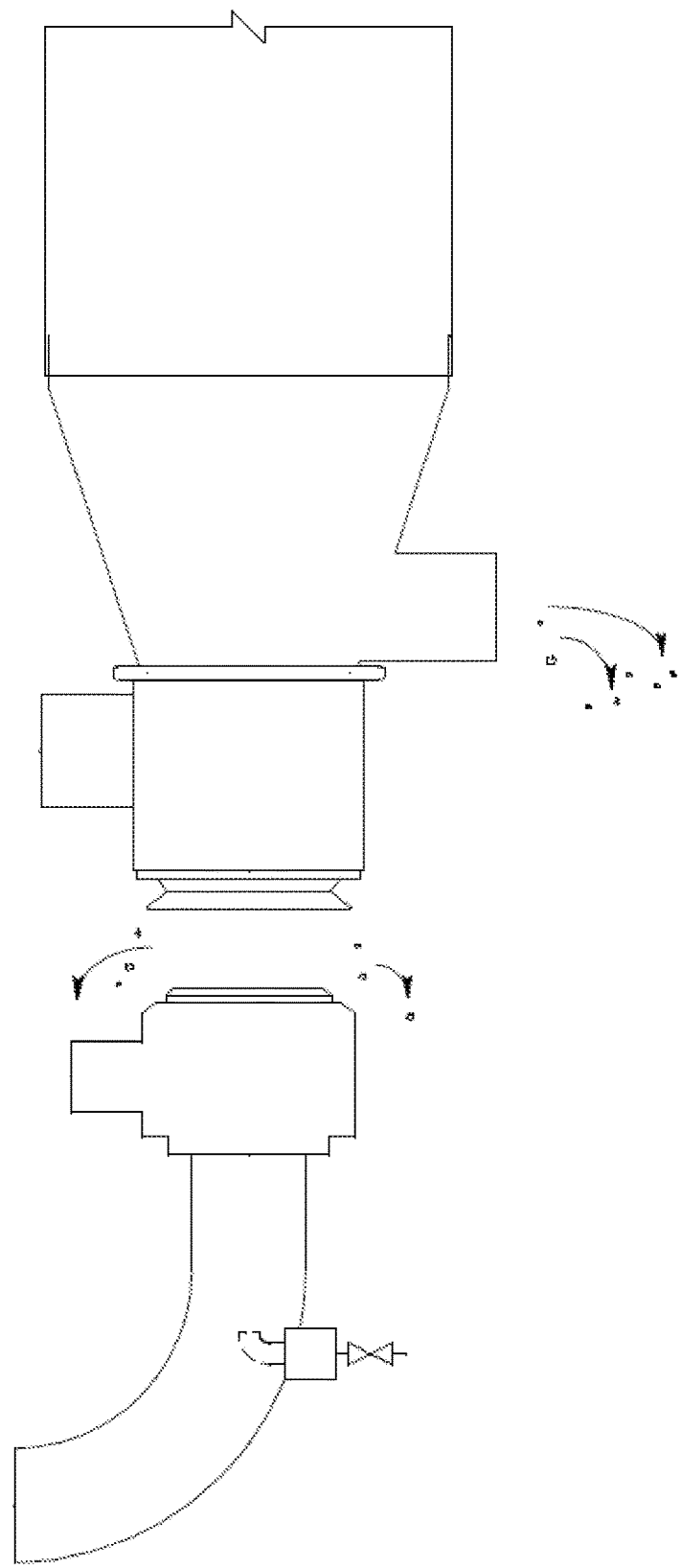
FIG. 6 illustrates another view of a multistage combustion furnace system at operating temperature showing the hot tuyere with reject port in accordance with another embodiment.

Now referring to FIG. 6 there is shown another view of the furnace system 12 for the thermal expansion of mineral particles at the flame temperature showing the reject port on the hot tuyere 47. Notice that the unexpanded or partly expanded ore granules sit in the lower part of the reject port which serves to partially fill the opening. This condition demonstrates the absence of pressure and airflow pulsing so characteristic of conventional furnaces where it is usual for hot gases and hot glowing heavier perlite particles spew out in a positive pulse and cold air enters on the negative side of the pressure pulse.

Figure 7:
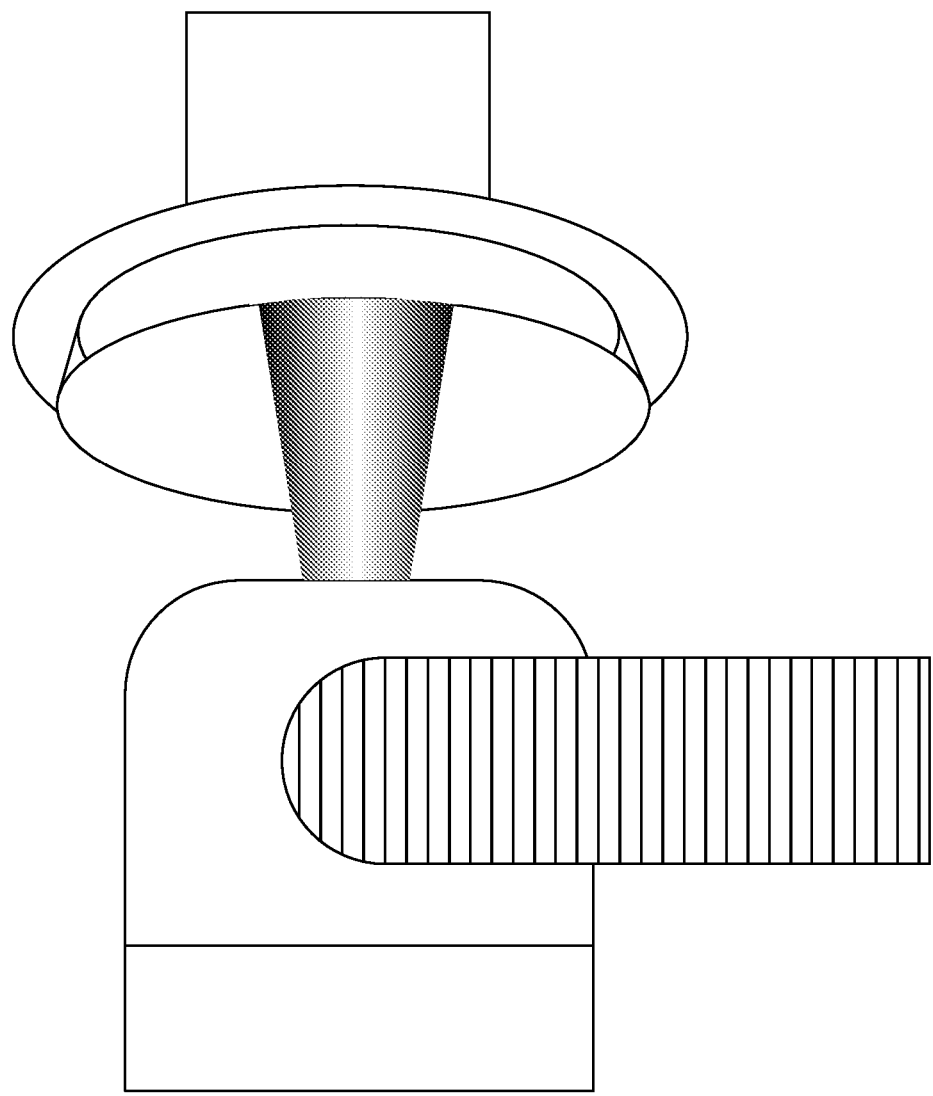
FIG. 7 illustrates a hot air ring device of the multistage combustion furnace system showing the open atmospheric gap between the hot air ring and the hot tuyere while burning fuel oil through a nozzle in accordance with another embodiment.

Now referring to FIG. 7 there is shown the furnace device 45 (or hot air ring device) sitting on the burner head 47 with an oil nozzle 23. Notice that the well defined steady flame begins at the nozzle 23 tip which is concentrically mounted below the venturi 43 within the body of the hot tuyere 49.

Figure 8:
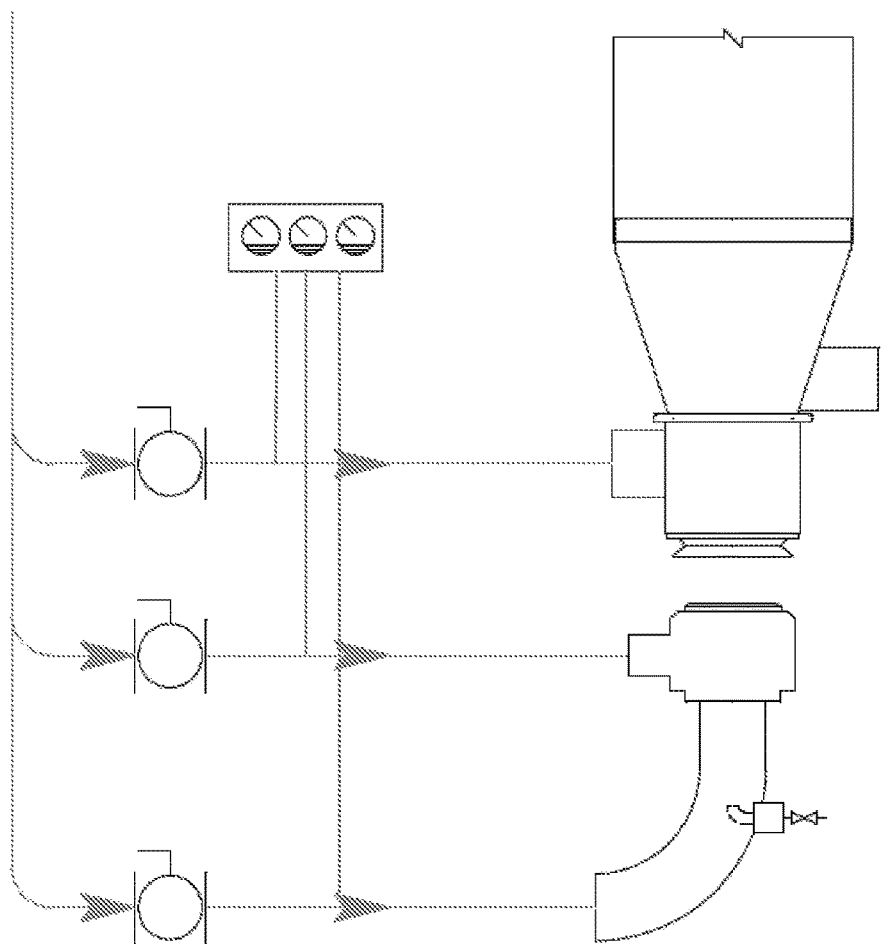
FIG. 8 illustrates the three air inlets of the multistage combustion furnace system with controls and instrumentations for the multistage combustion furnace system for thermal expansion of mineral particles in accordance with another embodiment.

Now referring to FIG. 8 there is shown the inlets 42, 44 and 46 of the multistage combustion furnace system, dampers and instrumentation to adjust the split of air between the burner head, the hot air ring device and the hot tuyere. Ore feed rate, burner management and other combustion air settings remain in the control of the operator as they are today. Automatic furnace draft control (not shown) to modulate the draw of air through the furnace with a motorized damper is extremely useful to ensure stable and smooth furnace operation. This is achieved by having a pressure sensor fitted to the top of the furnace reporting to a pressure controller that operates an exhaust air damper modulating the exhaust air flow. The precise control of the static air pressure at the top of the furnace system produces control over the quantity of secondary air admitted to the base of the tuyere in the gap above the burner head and limits the cold air ingress at every opening, especially the open reject port on the side of the tuyere. This absolutely minimizes cold air ingress to a consistent level which is adjusted to be slightly over the stoichiometric requirement and yields a highly responsive efficient operation.

Figure 9:
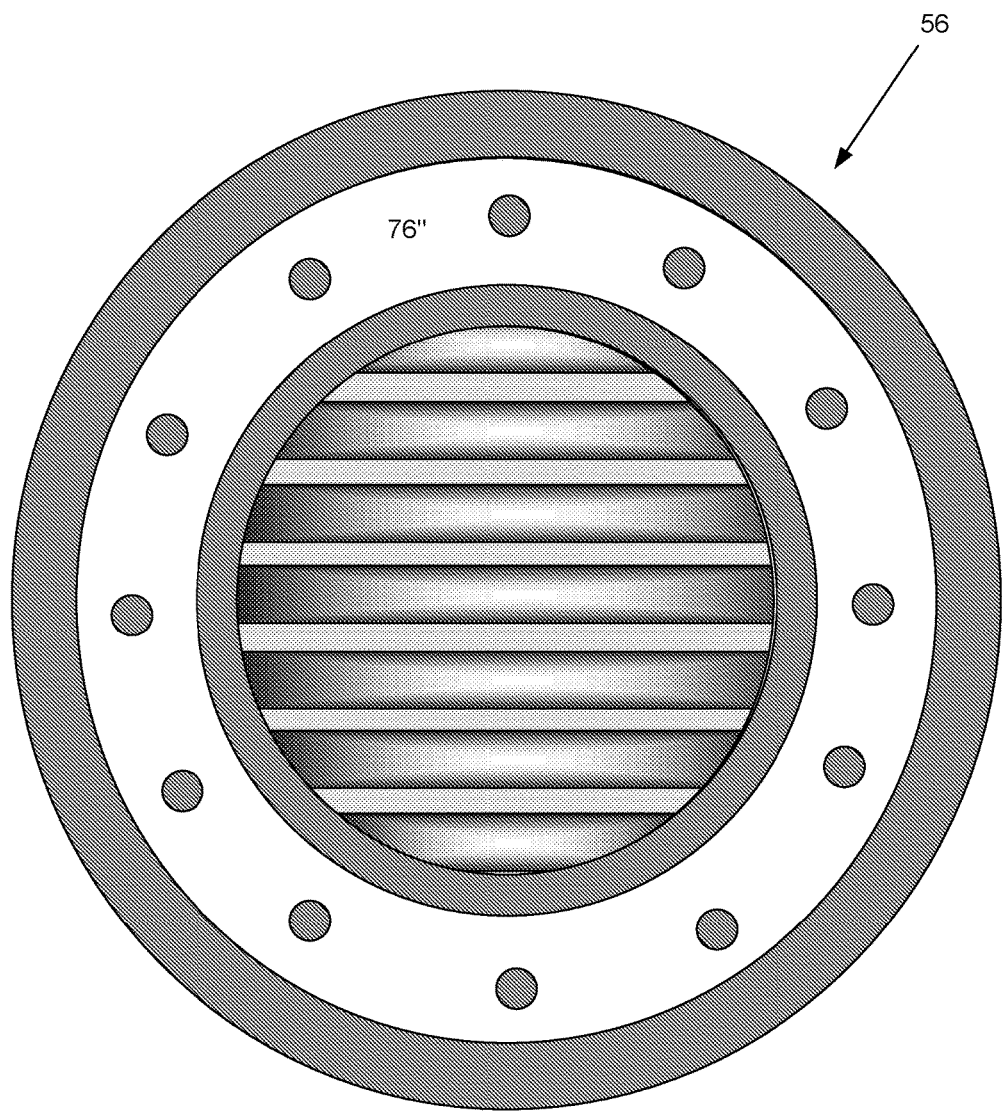
FIG. 9 illustrates a heat exchanger part of the process for the thermal expansion of mineral particles in accordance with another embodiment.

Now referring to FIG. 9 there is shown a heat exchanger 56 of the process 10 for the thermal expansion of mineral particles. It is to be noted that a heat exchanger 56 to pre-heat combustion air 19 for entering the furnace system 12 designed for heat treating or expanding finely divided particles is well-known in the prior art.

The process 10 and the furnace system 12 can be used with both liquid and gaseous fuels however, there are significant differences in the venturi 43 and annulus area 58 and in the velocity through the hot air ring device, or furnace device 45. The rest of the process 10 and of the furnace system remains the same system as described above.

In the case of the oil-fired multistage combustion furnace system 12 as shown in FIGS. 1 and 10, metered fuel is atomized in a single or two fluid nozzle 23 centered below the venturi 43. First it is necessary to use a flow restrictor in the form of a disc (venturi crown 50) fitted across the venturi 43. The venturi crown 50 presents a flat impinging surface where some of the fuel, oil for example, impact the disc, coalesce, and flow to the edges where the accelerating fuel cloud atomizes that portion of the fuel leaving the disc. Various designs of the venturi crowns 50 are shown in FIGS. 4A, 4B, 14A, 14B, 15A, 15B, 16A and 16B. Moreover, with an oil-fired multistage combustion furnace system 12, combustion takes place above the venturi 43 with little to no flame below it in the atmospheric coupling zone. In the oil-fired furnace system 12, it is advantageous to split the three pre-heated combustion air inlets 42, 44 and 46 as follows: 5-15% air to the hot air ring, or furnace device 45 (air inlet 44) to fill the atmospheric coupling and the balance split with similar amounts of air through the bottom burner head 47 (inlet 42) and top tuyere 49 (inlet 46) above the venturi 43.

The pre-heated air 13 initiates fuel oil evaporation providing a higher energy state before the combustion chamber above the venturi 43. This method of fuel/air preparation provides excellent conditions for complete combustion. The three stages combustion air inlets (inlet 42, 44 and 46) allows the operator to control the air to fuel ratio at three points; in the traditional burner head 47, at the atmospheric coupling via the hot air ring (or furnace device 45) and above the venturi 43 in the furnace system 12. It has been found that perlite expansion increases by 10 to 20% when the central air rising up across the atmospheric coupling into the venturi 43 is near half of the air required for complete combustion. This results in an extremely fuel rich and hot fuel cloud entering the furnace system 12 through the venturi 43 (inlet 46). Final combustion air enters the final firing zone in a high speed annulus surrounding the fuel cloud as it emerges vertically up from the venturi 43.

On the other hand, with a gas-fired furnace system 12, there is no need for any flow restrictor (venturi crown 50) across the venturi since the fuel is perfectly miscible in the air by its nature. Also, with gaseous fuel, combustion begins below the venturi 43 (below inlet 46) and traditionally this presents operational problems defined as flame spill. With any significant gas burning in the region of the atmospheric coupling, a pressure wave results from the expanding gas that acts in all directions. Flame spilling pushes gas away from the center where it is falling away from the pressure pull of the venturi 43 (inlet 46) and is fuel lost to the process 10.

This problem is alleviated by greatly reducing the amount of air delivered below the venturi 43 (below inlet 46). It is advantageous to split the three pre-heated combustion air inlets 42, 44 and 46 as follows: about 5-15% of the preheated air 13 to the hot air ring device (or furnace device 45) to fill the atmospheric coupling (inlet 44), about 20-30% through the burner head 47 (inlet 42) and the balance, being the major portion, up through the annulus area 58 of the venturi 43 (inlet 46). This results in a larger annulus 58 (inlet 46) than required for oil fired furnace systems 12. Additionally, it is advantageous to provide air jets in rings supplying oxygen rich air at the base of the flame inside the tuyere 49. For example, FIGS. 14A, 14B, 15A, 15B, 16A and 16C depicts two rows of ring jet portions 48; the first row ejecting air perpendicular to the fuel cloud at the venturi 43/tuyere 49 interface while the second row of ring jet portions are positioned on the conical walls of the tuyere 49 just above the venturi 43. The sum of the area of the one, two or more rows of ring jet portions is small in relation to the annulus area, being about one fifth of the area of the annulus area 58.

Moreover, flame spills are further abated in gaseous systems by increasing the exit velocity of the air leaving the hot air ring device (or furnace device 45) compared to the case when burning fuel oil.

The process 10 and the furnace system 12 provides the ability to keep the air fuel mixture seriously oxygen deficient below the venturi 43 thereby reducing flame spill as an inefficiency factor and reserving the needed oxygen for addition to the burning air/fuel mixture above the venturi inside the tuyere 49.

It is to be noted that the pre-heated air 13 is returned to the base of the furnace system 12 where it is split into three adjustable streams in the air inlets. The major portion is supplied to the burner head 47; secondly a hot air curtain peripherally extends the burner head 47 to replace the ingress of cold air between the burner head 47 and venturi 43 with now preheated air 13 freely obtained via the heat exchanger 56; the third air input enters the hot tuyere 49 above the established flame to provide a tertiary combustion stage surrounding the richly burning flame with higher oxygen lean air enveloping the advancing fuel cloud. Together with the automatic pressure control acting on the exhaust air drawn through the furnace system 12 the combustion thus achieved, having three stages of air admission advantageously arranged beginning at the center of the burner head 47, and peripherally above the burner head 47 and finally above the venturi 43 throat surrounding the rapidly evolving rising flame front is more uniform and complete, burning more powerfully than ever before and this produces a greater expansion effect in the mineral particles. In the case of perlite the expanded material produced is lighter as evidenced by a reduction in bulk density. Production rates go up in consequence. The invention saves fuel, ore and production time.

The furnace exhaust air 17 leaving the heat exchanger will be at a lower air temperature than before, so that the air temperature in the bag house filter will be reduced by a significant degree leading to longer bag life and lower maintenance costs.

Then, it is well known that inputs to any expanded mineral expansion process in order of costs are mineral ore, fuel (typically natural gas, propane or oil) and labour. At the opposite, the major output will be expanded mineral particles measured by volume.

The present invention will be more readily understood by referring to the following examples which are given to illustrate the invention rather than to limit its scope.

Example 1

Perlite Production

The process 10 of FIG. 1 was used to create a first prototype of the furnace device 45. Moreover, the furnace system 12, also shown in FIGS. 1 and 10 features a burner head 47 having an atmospheric coupling or open space between the burner head 47 and the venturi 43 has been used to illustrate the characterization of the production of perlite particles. The furnace system comprises a vertical expansion chamber 18, typically cylindrical, of about 18" diameter by about 10-12' tall, a hot tuyere 49 with entry, holding and high velocity annular nozzle zones 23 and a venturi crown 50 that extends from a point above the burner head 47 so as to leave a gap up to the vertical walls of the expansion chamber 18, a fuel or gas burner head 47 and a hot air ring device or furnace device 45 that can be installed on any vertical furnace system 12 where mineral particles fall down through a tube and meet a rising current of fuel (or gas)/air mixture and combustion gases (preheated air 13 for example). Instead of allowing cold air to freely enter the process, the hot air ring device 45 takes a portion of the pre-heated air 13 from the heat exchanger 56 and forms a hot air ring (or annular air curtain) at the base of the furnace system 12 to offset the quenching effect of the cold air normally drawn in at that point. Surprisingly, only a small amount of pre heated air 13 is required to accomplish this. It has been shown by this first prototype that perlite ore savings present a density of about 10% lower (6.65 lb/ft3 to 6.0 lb/ft3). This prototype also shows that the energy recovery system for thermal expansion of mineral particles provides about 15% to 20% in energy savings. Finally, the feed rate has been augmented from about 1 400 lb/hour to 1 800 lb/hour so then production went from about 222 cubic feet per hour to 275 cubic feet per hour.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A multistage combustion furnace system for an open furnace for thermal expansion of mineral particles, the open furnace being open to atmosphere and comprising an expansion chamber for receiving the mineral particles, the multistage combustion furnace system comprising:
   a burner head connected at a burner distance from and below the expansion chamber for operating the expansion chamber, the burner distance providing an atmospheric coupling of the burner head and the expansion chamber with the atmosphere;
   a furnace device connected at a furnace device distance from and below the expansion chamber, in the atmosphere, the furnace device and the expansion chamber being installed separated by a gap extending below the expansion chamber, the gap being open to both the expansion chamber and the atmosphere, where unexpanded mineral can fall out of the open furnace, and to provide an atmospheric coupling of the furnace device and the expansion chamber with the atmosphere, the furnace device comprising a ring portion installed peripherally from said burner head and comprising a channel directed toward the gap to generate an air curtain extending through the gap to offset the quenching effect of ambient air from the atmosphere normally drawn in an open furnace, wherein said furnace device is installed between said burner head and a tuyere kit; and
   the tuyere kit connected between said expansion chamber and said furnace device at a lower portion of the expansion chamber, the tuyere kit comprising an air inlet installed inside said tuyere kit to provide a preheated air intake causing a tertiary combustion stage surrounding a burning flame with higher oxygen air;
   wherein an inlet of preheated air is connected to each one of the burner head and the furnace device.

2. The multistage combustion furnace system kit of claim 1, wherein the furnace device provides a controlled secondary combustion stage and an atmospheric coupling of said burner head with the tuyere kit.

3. The multistage combustion furnace system kit of claim 2, wherein said burner head is for fuel.

4. The multistage combustion furnace system kit of claim 3, wherein said fuel is oil.

5. The multistage combustion furnace system kit of claim 2, wherein said burner head is for gas.

6. The multistage combustion furnace system kit of claim 2, wherein said air curtain comprises preheated air.

7. The multistage combustion furnace system kit of claim 2, wherein said air curtain comprises preheated combustion air.

8. The multistage combustion furnace system kit of claim 2, wherein said ring portion is of a circular configuration.

9. The multistage combustion furnace system kit of claim 1, wherein said air inlet is to be positioned at a point where combustion takes place above a venturi in an atmospheric coupling.

10. The multistage combustion furnace system kit of claim 1, wherein said air inlet is to be positioned at a point where combustion takes place partly below a venturi in an atmospheric coupling.

11. The multistage combustion furnace system kit of claim 1, wherein said air inlet is to be positioned at a point where the flame front is already established to provide a tertiary combustion stage surrounding a burning flame.

12. The multistage combustion furnace system kit of claim 1, wherein said air inlet is to be positioned at a point for a gas flame pre-ignition.

* * * * *